ns Patent Office
3,516,854
Patented June 23, 1970

3,516,854
ORGANOSILICON WATER-REPELLENCY AGENT AND METHOD OF APPLYING A WATER-REPELLENT COATING
James W. Curry, Dallas, Tex., assignor to Texas Instruments, Incorporated, Dallas, Tex., a corporation of Delaware
No Drawing. Filed July 6, 1967, Ser. No. 651,358
Int. Cl. B44d 1/46; C07f 7/04
U.S. Cl. 117—161    9 Claims

ABSTRACT OF THE DISCLOSURE

A water-repellency agent comprising a n-alkyltri-(n-alkoxy)silane, having the general formula:

$$RSi(OR')_3$$

where R is an alkyl radical having between 6 and 18 carbon atoms and R' is an alkyl radical having between 4 and 6 carbon atoms, for example, n-octadecyltri-(n-hexyloxy)silane and a method of applying a water-repellent coating to an article, such as paper, by applying a solution of the n-alkyltri-(n-alkoxy)silane in an unreactive solvent, such as benzene, to the article, drying the article to evaporate the solvent and heat-curing the coating formed on the article by evaporation of the solvent for about 10 minutes at about 350° F. Also, the use of 1,3-di-n-octyl-1,1,3,3-tetraethoxydisiloxane as a water-repellency agent and the method of applying the disiloxane by the above steps is detailed.

---

This invention relates to coatings, and in particular to synthetic resin-containings used as water-repellency agents and methods for applying such coatings.

In the past, organosilicon materials which may be referred to as organosiloxanes or silicones have been used in textile and paper water-repellency applications. These organo-silicon materials have been liquid polymers having CH$_3$SiHO structural units. Typical materials are described in Meals et al., Silicones, Reinhold Publishing Corporation, New York, N.Y., 1959, pp. 196–199.

Similarly, reactions of end-blocked CH$_3$SiHO structures with vinyl silicon compounds in the presence of an appropriate organic solvent and a peroxide catalyst to produce a water-repellent coating is also known. The latter type reaction may be found described in U.S. Pat. No. 3,065,111, issued Nov. 20, 1962, to Reeves, et al. The practice in using both the materials described above has been to apply them to the material to be treated either in aqueous emulsion form or as solutions with an organic solvent. The material, once treated, is then heated to about 125° C. to 150° C. to effect curing of the agent. In some instances, curing catalysts such as tin or zinc soaps are required.

It is also known that alkoxysilanes may be prepared by the following equations:

(1) $\quad RSiCl_3 + 3R'OH \longrightarrow RSi(OR')_3 + 3HCl$ (2) $\quad RSi(OC_2H_5)_3\ 3R'OH \xrightarrow{Na} RSi(OR')_3 + 3C_2H_5OH$ and that the following reactions may also be carried out:

(3) $\quad R'OH + HCl \longrightarrow R'Cl + H_2O$ (4) 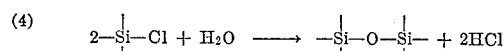

(5) 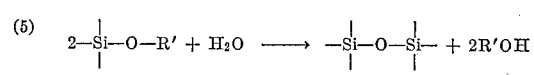

where R and R' are alkyl radicals. See for example, Eaborn, Organosilicon Compounds, Butterworths Scientific Publications, London, 1960, pp. 288–289.

The present invention may be generally described as a n-alkyltri-(n-alkoxy)silane having the general formula:

$$RSi(OR')_3$$

where R is an alkyl radical having from 6 to 18 carbon atoms, and R' is an alkyl radical having from 4 to 6 carbon atoms, which is used as a water-repellency agent, and a method for applying such compounds to an article by dissolving a n-alkyltri-(n-alkoxy)silane in a suitable organic solvent, applying the solution to an article, drying the article to evaporate the solvent and heat-curing the coating formed on the article by evaporation of the solvent at an elevated temperature. The invention also is directed to the use of 1,3-di-n-octyl-1,1,3,3-tetraethoxydisiloxane as a water-repellency agent and its method of application by the above described method. Water-repellency agents in accordance with the invention may be prepared by reaction (2) above, as the following examples demonstrate.

EXAMPLE I

Preparation of n-hexyltri-(n-butoxy)silane

To a single neck flask was added n-hexyltri-(ethoxy)silane (1175.0 grams or 4.73 moles), n-butyl alcohol (1050.0 grams or 14.19 moles) and metalic sodium (3.24 grams or 0.1419 moles). The flask was fitted with a water-cooled condenser and equipped with a magnetic stirrer. After the reactants had been added to the flask, and the condenser fitted in the neck of the flask, the reactants were warmed until the sodium had completely reacted, in this instance approximately four hours. The products of the reaction were then distilled to remove the ethyl alcohol. After removal of the ethyl alcohol, the reaction product was fractionally distilled in conventional equipment producing a fraction boiling between 142° C. and 144° C. at 3.5 mm. Hg and weighing 720.2 grams. The fraction, upon analysis, proved to be n-hexyltri-(n-butoxy)silane which may be represented by the formula:

$$n=C_6H_{13}Si(OC_4H_9=n)_3$$

EXAMPLE II

Preparation of n-hexyltri-(n-hexyloxy)silane

The procedure of Example I was followed, with the following starting materials:

| Reactants | Weight | |
|---|---|---|
| | Grams | Moles |
| n-C$_6$H$_{13}$Si(OC$_2$H$_5$)$_3$ | 938.0 | 3.78 |
| n-C$_6$H$_{13}$OH | 1,157.0 | 11.34 |
| Na | 4.35 | 0.189 |

Fractional distillation produced a fraction boiling between 180° C. and 185° C. between 0.03 mm. Hg and 0.008 mm. Hg and weighing 978.0 grams. The fraction upon analysis proved to be n-hexyltri-(n-hexyloxy)silane.

EXAMPLE III

Preparation of n-octyltri-(n-hexyloxy)silane

The procedure of Example I was followed, with the following starting materials:

| Reactants | Weight | |
|---|---|---|
| | Grams | Moles |
| n-C$_8$H$_{17}$Si(OC$_2$H$_5$)$_3$ | 1,104.5 | 4.0 |
| n-C$_6$H$_{13}$OH | 1,225.2 | 12.0 |
| Na | 3.68 | 0.16 |

Fractional distillation produced a fraction boiling between 149° C. and 154° C. between 0.025 mm. Hg and 0.04 mm. Hg and weighing 1599.0 grams. The fraction upon analysis proved to be n-octyltri-(n-hexyloxy)silane.

EXAMPLE IV

Preparation of n-decyltri-(n-hexyloxy)silane

The procedure of Example I was followed with the following starting materials:

| Reactants | Weight | |
|---|---|---|
| | Grams | Moles |
| n-$C_{10}H_{21}$Si(O$C_2H_5$)$_3$ | 1,012.3 | 3.33 |
| n-$C_6H_{13}$OH | 1,020.0 | 9.99 |
| Na | 3.08 | 0.134 |

Fractional distillation produced a fraction boiling between 167° C. and 188° C. between 0.006 mm. Hg and 0.03 mm. Hg which weighed 890.0 grams. The fraction upon analysis proved to be n-decyltri-(n-hexyloxy)silane.

EXAMPLE V

Preparation of n-dodecyltri-(n-butoxy)silane

The procedure of Example I was followed, with the following starting materials:

| Reactants | Weight | |
|---|---|---|
| | Grams | Moles |
| n-$C_{12}H_{25}$Si(O$C_2H_5$)$_3$ | 2,158.5 | 6.5 |
| n-$C_4H_9$OH | 1,445.2 | 19.5 |
| Na | 18.0 | 0.78 |

Fractional distillation produced a fraction boiling between 140° C. and 150° C. between 0.04 mm. Hg and 0.06 mm. Hg and weighing 1624.9 grams. The fraction, upon analysis, proved to be n-dodecyltri-(n-butoxy)silane.

EXAMPLE VI

Preparation of n-dodecyltri-(n-hexyloxy)silane

The procedure of Example I was followed, with the following starting materials:

| Reactants | Weight | |
|---|---|---|
| | Grams | Moles |
| n-$C_{12}H_{25}$Si(O$C_2H_5$)$_3$ | 1,826.6 | 5.5 |
| n-$C_6H_{13}$OH | 1,684.7 | 16.5 |
| Na | 12.8 | 0.55 |

Fractional distillation produced a fraction boiling between 189° C. and 194° C. between 0.02 mm. Hg and 0.03 mm. Hg and weighing 1916.7 grams. The fraction upon analysis proved to be n-dodecyltri-(n-hexyloxy)silane.

EXAMPLE VII

Preparation of n-octadecyltri-(n-butoxy)silane

The procedure of Example I was followed with the following starting materials:

| Reactants | Weight | |
|---|---|---|
| | Grams | Moles |
| n-$C_{18}H_{37}$Si(O$C_2H_5$)$_3$ | 1,248.0 | 3.0 |
| n-$C_4H_9$OH | 667.0 | 9.0 |
| Na | 0.69 | 0.03 |

Fractional distillation produced a fraction boiling between 192° C. and 199° C. between 0.04 mm. Hg and 0.15 mm. Hg which weighed 923.4 grams. The fraction, upon analysis, proved to be n-octadecyltri-(n-butoxy)silane.

EXAMPLE VIII

Preparation of n-octadecyltri-(n-hexyloxy)silane

The procedure of Example I was followed with the following starting materials:

| Reactants | Weight | |
|---|---|---|
| | Grams | Moles |
| n-$C_{18}H_{37}$Si(O$C_2H_5$)$_3$ | 736.0 | 1.76 |
| n-$C_6H_{13}$OH | 539.0 | 5.28 |
| Na | 2.9 | 0.123 |

Fractional distillation produced a fraction boiling between 222° C. and 228° C. between 0.01 mm. Hg and 0.03 mm. Hg and weighing 730.7 grams. The fraction, upon analysis, proved to be n-octadecyltri-(n-hexyloxy)silane.

The above silanes exhibited the physical properties listed in Table I below:

TABLE I

| Silane of Example | Molecular weight | | Ref. index, $n_D^{25}$ | Density, $d_l^{25}$ | Specific refractivity, $R_D$ | |
|---|---|---|---|---|---|---|
| | Calcd. | Found[1] | | | Calcd.[2] | Found |
| I | 332.6 | 326.2 | 1.4230 | 0.8673 | 0.2938 | 0.2936 |
| II | 416.8 | 413.8 | 1.4330 | 0.8634 | 0.3014 | 0.3010 |
| III | 444.8 | 430.1 | 1.4353 | 0.8619 | 0.3033 | 0.3029 |
| IV | 472.9 | 455.7 | 1.4378 | 0.8611 | 0.3049 | 0.3047 |
| V | 416.8 | 400.9 | 1.4329 | 0.8635 | 0.3014 | 0.3009 |
| VI | 500.9 | 477.2 | 1.4395 | 0.8604 | 0.3064 | 0.3060 |
| VII | 500.9 | 483.3 | 1.4399 | 0.8608 | 0.3064 | 0.3061 |
| VIII | 585.1 | 552.5 | 1.4445 | 0.8581 | 0.3100 | 0.3099 |

[1] Molecular Weights were determined cryoscopically, in benzene.
[2] Calculated specific refractivities were obtained from bond refractivity values summarized in the following references: A. I. Vogel, W. T. Cresswell, G. H. Jeffery, and J. Leicester, J. Chem. Soc., 514 (1952); and A. I. Vogel, W. T. Cresswell, and J. Leicester, J. Phys. Chem., 58, 174 (1954).

In order to test the water-repellency effectiveness of various n-alkyltri-(n-alkoxy)silanes, they were coated on a paper material in a manner to be described more fully hereafter.

The paper material was prepared from lightly beaten, bleached, softwood, sulfite pulp using deionized water in the beating and sheet forming processes. Sheets weighing 2.5 grams each were formed on an 8 by 8 inch Noble & Wood mold and were subsequently pressed five minutes at 50 p.s.i. and then drum dried for seven minutes at 225° F. Prior to application of a solution of the water-repellency agent the sheets were allowed to condition at 73° F. and 50 percent relative humidity.

The paper sheets, prepared as described above, were then treated as described in the following examples:

EXAMPLE IX

Strips (4 by 4 inches) of the paper sheets were sprayed with a benzene solution containing 0.2 percent by volume n-hexyltri-(n-butoxy)silane (the material of Example I). The strips were then air dried and cured in an oven for 10 minutes at 350° F. The strips were then folded to form boats having one-inch square flat bottoms with the sides folded back to prevent wicking at the edges. The boats were placed on the surface of distilled water at 73° F. The bottom of the boats were not penetrated by the water until the passage of 147.2 seconds, and thus the coating was assigned a water-repellency value of 147.2 seconds.

EXAMPLE X

Strips (4 by 4 inches) of the paper sheets were dipped in a benzene solution containing 3.0 percent by volume n-hexyltri-(n-hexyloxy)silane (the material of Example II). The strips were then air dried and oven cured for 10 minutes at 350° F. Boats were made from the strips in the manner described in Example IX. The boats after being placed in distilled water at 73° F. for 10 minutes were not penetrated by the water, so the boats were removed, and the coating assigned a water-repellency value of 600+ seconds.

EXAMPLE XI

The test of Example X was repeated, except the boats were dipped in an isopropyl alcohol solution containing 3.0 percent by volume n-hexyltri-(n-hexyloxy)silane (the material of Example II). The resulting coating had a water-repellency value of 170 seconds.

EXAMPLE XII

The test of Example X was repeated using a benzene solution containing 3.0 percent by volume n-octyltri-(n-hexyloxy)silane (the material of Example III). The coating had a water-repellency value of 600+ seconds.

EXAMPLE XIII

The test of Example XI was repeated using an isopropyl alcohol solution containing 3.0 percent by volume n-octyltri-(n-hexyloxy)silane (the material of Example III). The resulting coating had a water-repellency value of 600+ seconds.

EXAMPLE XIV

The test of Example X was repeated using a benzene solution containing 3.0 percent by volume n-decyltri-(n-hexyloxy)silane (the material of Example IV). The resulting coating had a water-repellency value of 600+ seconds.

EXAMPLE XV

The test of Example XI was repeated using an isopropyl alcohol solution containing 3.0 percent by volume n-decyltri-(n-hexyloxy)silane (the material of Example IV). The resulting coating had a water-repellency value of 600+ seconds.

EXAMPLE XVI

To both sides of strips (4 by 4 inches) was applied a benzene solution containing 0.2 percent by volume n-dodecyltri-(n-butoxy)silane (the material of Example V). The strips were then sprayed with benzene to thoroughly distribute the benzene solution throughout the paper. After air drying and curing of the strips for 10 minutes at 350° F., boats prepared from the strips were placed on distilled water at 73° F. as described in Example IX. The coating formed on the paper was found to have a water-repellency value of 600+ seconds, while an identical test of the same silane material in a 0.2 percent by volume solution in isopropyl alcohol produced a coating having a water-repellency value of 67.5 seconds.

EXAMPLE XVII

The test of Example XVI was repeated using a benzene solution containing 0.2 percent by volume n-dodecyltri-(n-hexyloxy)silane (the material of Example VI) which resulted in a coating having a water-repellency value of 600+ seconds, while application of the same silane material in a 0.2 percent by volume solution in isopropyl alcohol produced a coating having a water-repellency value of 79.6 seconds.

EXAMPLE XVIII

The test of Example IX was repeated using a benzene solution containing 0.2 percent by volume n-octadecyltri-(n-butoxy)silane (the material of Example VII) which produced a coating having a water-repellency value of 600+ seconds. Repeat of the same test using an isopropyl alcohol solution containing 0.2 percent by volume of the same silane produced a coating having a water repellency value of 59.1 seconds.

EXAMPLE XIX

The test of Example IX was repeated using a benzene solution containing 0.2 percent by volume n-octadecyltri-(n-hexyloxy)silane (the material of Example VIII), which produced a coating having a water-repellency value of 600+ seconds. The identical test using an isopropyl alcohol solution containing 0.2 percent by volume of the same silane also produced a coating having a water-repellency value of 600+ seconds.

As a by-product of reactions (1) above, a disiloxane compound is formed by the mechanism of reactions (3), (4), and (5).

In particular, 1,3-di-n-octyl-1,1,3,3-tetraethoxydisiloxane may be prepared as follows:

EXAMPLE XX

From the reaction product of n-$C_8H_{17}SiCl_3$ (1374.2 grams or 5.6 moles) with ethyl alcohol (774.0 grams or 16.8 moles) was distilled n-$C_8H_{17}Si(OC_2H_5)_3$ leaving a residue of 745.3 grams. The residue was treated with anhydrous ammonia and filtered to remove $NH_4Cl$ formed during the ammonia treatment. The treated residue, 726.0 grams, was fractionally distilled yielding a fraction which boiled between 170° C. and 169° C. between 0.66 mm. Hg and 0.58 mm. Hg and weighed 300.1 grams. This fraction had a refractive index ($n_D^{25}$) of 1.4256–1.4258 and upon analysis proved to be 1,3-di-n-octyl-1,1,3,3-tetraethoxydisiloxane.

The disiloxane material exhibited the physical properties listed in Table II below:

TABLE II

| Disiloxane of Example | Molecular weight | | Ref. index, $n_D^{25}$ | Density, $d_4^{25}$ | Specific refractivity, $R_D$ | |
|---|---|---|---|---|---|---|
| | Calcd. | Found [1] | | | Calcd.[2] | Found |
| XX | 478.9 | 437.4 | 1.4258 | 0.9034 | 0.2836 | 0.2835 |

[1] Molecular weights were determined cryoscopically, in benzene.
[2] Calculated specific refractivities were obtained from bond refractivity values summarized in the following references: A. I. Vogel, W. T. Cresswell, G. H. Jeffrey, and J. Leicester, J. Chem. So., 514 (1952); and A. I. Vogel, W. T. Cresswell, and J. Leicester, J. Phys. Chem., 58, 174 (1954).

The water-repellency effectiveness of the disiloxane material was tested as follows:

EXAMPLE XXI

The test of Example IX was repeated using a benzene solution containing 0.2 percent by volume 1,3-di-n-octyl-1,1,3,3-tetraethoxydisiloxane. The resulting coating had a water-repellency value of 214.8 seconds. Repeat of the identical test using an isopropyl alcohol solution containing 0.2 percent by volume of the same disiloxane produced a coating having a water-repellency value of 17.2 seconds.

While rather specific embodiments of the invention have been described above, the water-repellency agent may be generally described as encompassing n-alkyltri-(n-alkoxy)silanes having the general formula:

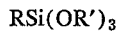

where R is an alkyl radical having between 6 and 18 carbon atoms, and R' is an alkyl radical having between 4 and 6 carbon atoms. Thus, while embodiments in which R and R' are alkyl radicals having an even number of carbon atoms were described, the compounds resulting from the use of alkyl radicals having odd numbers of carbon atoms are also useful.

Also, while benzene has been described as a suitable unreactive non-polar solvent, and isopropyl alcohol as a suitable unreactive polar solvent, other suitable organic solvents may be used, since the function of the solvent is to permit uniform distribution of small quantities of the water-repellency agent in order to render more economical the application of a water-repellent coating to an article, such as a paper or textile. While solutions containing in excess of 3.0 percent by volume of the water-repellency agent may be used, they are not as economical, since satisfactory coatings can be obtained with smaller concentrations. Also, while the coating may be cured at a lower temperature, more time is required, and thus the described temperature is preferred.

While rather specific terms have been used to describe

I claim:
1. The method of applying a water-repellent coating to an article, comprising the steps of:
applying to the article a solution of a n-alkyltri-(n-alkoxy)silane having the general formula:

$$RSi(OR')_3$$

where:
R is an alkyl radical having between 6 and 18 carbon atoms, and
R' is an alkyl radical having between 4 and 6 carbon atoms in a suitable unreactive organic solvent;
drying said article to evaporate the solvent; and
heat-curing the coating deposited on said article by evaporation of said solvent at an elevated temperature.

2. The method of claim 1, wherein said solvent is benzene and the n-alkyltri-(n-alkoxy)silane in said benzene is between about 0.2 and 3.0 percent by volume.

3. The method of claim 2, wherein said coating is cured for about 10 minutes at about 350° F.

4. The method of claim 1, wherein said solvent is isopropyl alcohol and the n-alkyltri-(n-alkoxy)silane in said isopropyl alcohol is between about 0.2 and 3.0 percent by volume.

5. The method of claim 1, wherein said n-alkyltri-(n-alkoxy)silane is n-octadecyltri-(n-hexyloxy)silane.

6. The method of claim 5, wherein said solvent is benzene.

7. The method of claim 6, wherein said coating is cured for about 10 minutes at about 350° F.

8. For use as a water-repellency agent, 1,3-di-n-octyl-1,1,3,3-tetraethoxydisiloxane.

9. A method of applying a water-repellency coating to an article, comprising the steps of:
applying to the article a solution of 1,3-di-n-octyl-1,1,3,3-tetraethoxydisiloxane in a suitable unreactive organic solvent;
drying the article to evaporate the solvent; and
heat-curing the coating formed on the article by evaporation of the solvent at an elevated temperature.

References Cited

UNITED STATES PATENTS

| | | | |
|---|---|---|---|
| 2,528,554 | 11/1950 | Rust | 117—135.5 |
| 2,706,723 | 4/1955 | Bass | 117—161 X |
| 2,706,724 | 4/1955 | Bass | 117—161 X |
| 2,947,772 | 8/1960 | Eynon et al. | 260—448.8 |
| 3,057,822 | 10/1962 | Rust et al. | 260—46.5 |
| 3,377,371 | 4/1968 | Quaal | 117—135.5 X |

WILLIAM D. MARTIN, Primary Examiner

T. G. DAVIS, Assistant Examiner

U.S. Cl. X.R.

117—135.5, 155; 260—448.8